United States Patent
Kim et al.

(10) Patent No.: US 8,824,253 B2
(45) Date of Patent: Sep. 2, 2014

(54) OPTICAL PICKUP AND OPTICAL SYSTEM USING THE SAME

(71) Applicant: Toshiba Samsung Storage Technology Korea Corporation, Suwon-wi (KR)

(72) Inventors: Ui-yol Kim, Suwon-si (KR); Ji-sun Ahn, Seoul (KR); Yong-jae Lee, Suwon-si (KR)

(73) Assignee: Toshiba Samsung Storage Technology Korea Corporation, Suwon-si (KR)

(*) Notice: Subject to any disclaimer, the term of this patent is extended or adjusted under 35 U.S.C. 154(b) by 0 days.

(21) Appl. No.: 13/744,701

(22) Filed: Jan. 18, 2013

(65) Prior Publication Data

US 2013/0185742 A1    Jul. 18, 2013

(30) Foreign Application Priority Data

Jan. 18, 2012  (KR) .................. 10-2012-0005855

(51) Int. Cl.
    *G11B 7/00*    (2006.01)

(52) U.S. Cl.
    USPC .................................. 369/44.24; 369/112.23

(58) Field of Classification Search
    USPC ................ 369/44.24, 112.01, 112.05, 112.23
    See application file for complete search history.

(56) References Cited

U.S. PATENT DOCUMENTS

| 3,913,076 | A | * | 10/1975 | Lehureau et al. | 369/109.01 |
| 4,378,491 | A | * | 3/1983 | Lehman | 369/18 |
| 5,673,246 | A | * | 9/1997 | Ootaki et al. | 369/112.23 |
| 2001/0048809 | A1 | * | 12/2001 | Kajiyama et al. | 386/126 |
| 2009/0073855 | A1 | * | 3/2009 | Ishii | 369/112.23 |

FOREIGN PATENT DOCUMENTS

| KR | 1999-0074653 | 10/1999 |
| KR | 2005-149543 | 6/2005 |

* cited by examiner

*Primary Examiner* — Brenda Bernardi
(74) *Attorney, Agent, or Firm* — NSIP Law

(57) ABSTRACT

Provided are an optical pickup and an optical system using the same. The optical pickup may include an aperture that is disposed at a side where a light beam is incident on an objective lens. The aperture may limit a range of the light beam such that a width of the light beam incident on the objective lens in a first direction is less than a width in a second direction that is perpendicular to the first direction.

18 Claims, 6 Drawing Sheets

CIRCULAR APERTURE    OBLONG APERTURE (a)

(b)

us8824253b2

OPTICAL PICKUP AND OPTICAL SYSTEM USING THE SAME

CROSS-REFERENCE TO RELATED APPLICATION(S)

This application claims the benefit under 35 USC 119(a) of Korean Patent Application No. 10-2012-0005855, filed on Jan. 18, 2012, in the Korean Intellectual Property Office, the entire disclosure of which is incorporated herein by reference for all purposes.

BACKGROUND

1. Field

The following description relates to an optical pickup and an optical system using the same, and more particularly, to an optical pickup that has a reduced height.

2. Description of Related Art

Optical pickups are used to record/reproduce information to a disc by focusing light emitted from a light source onto a disc-type optical information storage medium using an objective lens. Optical pickups are typically in included in an optical disk drive. For portable devices such as notebook computers, gaming consoles, and the like, it is desirable for the optical disc drive to be of slim design to decrease an overall size of the system and to reduce an overall amount of space needed to house the drive.

In an optical pickup, a light beam is incident through a circular aperture on an objective lens. Typically, an optical pickup has a height that corresponds to a diameter of an entrance pupil of the objective lens. In order to realize a slim optical drive, the height of an optical pickup should be reduced. Described herein is technology for reducing the size of an optical pickup.

SUMMARY

In an aspect, there is provided an optical pickup including an optical unit comprising at least one light source configured to emit a light beam for recording/reproducing information to/from an information storage medium, and at least one photodetector configured to detect an information signal and/or an error signal by detecting a light beam reflected from the information storage medium, an objective lens configured to focus a light beam incident from the optical unit on the information storage medium, and an aperture that is disposed at a side at which the light beam is incident from the optical unit on the objective lens, and configured to limit a range of the light beam such that a width of the light beam incident on the objective lens in a first direction corresponding to a height direction of the optical pickup is less than a width in a second direction that is perpendicular to the first direction.

The aperture may comprise an oblong shape.

A ratio of the width of the aperture in the first direction to the width of the aperture in the second direction may be equal to or greater than 80%.

The first direction of the aperture may comprise a tangential direction and the second direction of the aperture may comprise a radial direction.

The aperture may be integrally formed with the objective lens.

The optical pickup may comprise a height that is approximately equal to the width of the aperture in the first direction.

In an aspect, there is provided an optical pickup including an optical unit comprising at least one light source configured to emit a light beam for recording/reproducing information to/from an information storage medium, and at least one photodetector configured to detect an information signal and/or an error signal by detecting a light beam reflected from the information storage medium, and an objective lens configured to focus a light beam incident from the optical unit on the information storage medium, the objective lens comprising an entrance pupil that has an oblong shape.

The entrance pupil may comprise a width in a first direction corresponding to a height direction of the optical pick that is less than a width in a second direction that is perpendicular to the first direction.

A ratio of the width of the entrance pupil in the first direction to the width of the entrance pupil in the second direction may be equal to or greater than 80%.

The first direction of the entrance pupil may be a tangential direction and the second direction of the entrance pupil may be a radial direction.

The optical pickup may comprise a height that is approximately equal to the width of the entrance pupil in the first direction.

In an aspect, there is provided an optical system including the optical pickup configured to move in a radial direction of an information storage medium and configured to record and/or reproduce information to and/or from the information storage medium, the optical pickup comprising an objective lens configured to focus a light beam incident from an optical unit on the information storage medium, and an aperture comprising an entrance pupil that has an oblong shape, and a control unit configured to control the optical pickup.

The entrance pupil may comprise a width in a first direction corresponding to a height direction of the optical pick which is less than a width in a second direction that is perpendicular to the first direction.

The optical pickup may comprise a height that is approximately equal to the width of the entrance pupil in the first direction.

A ratio of the width of the entrance pupil in the first direction to the width of the entrance pupil in the second direction may be equal to or greater than 80%.

Other features and aspects may be apparent from the following detailed description, the drawings, and the claims.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
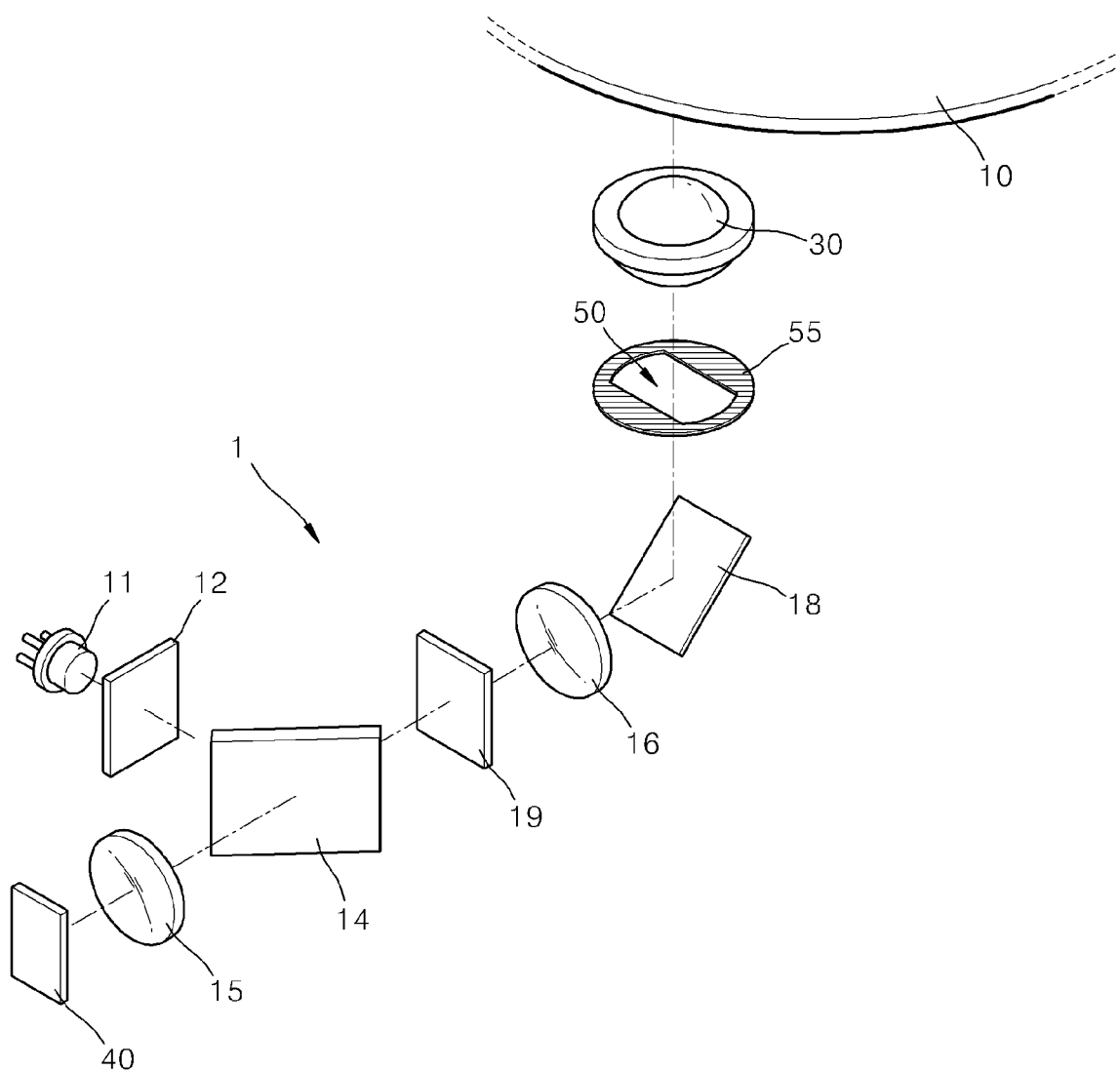
FIG. 1 is a diagram illustrating an example of an exploded perspective view of an optical pickup.
Figure 2:
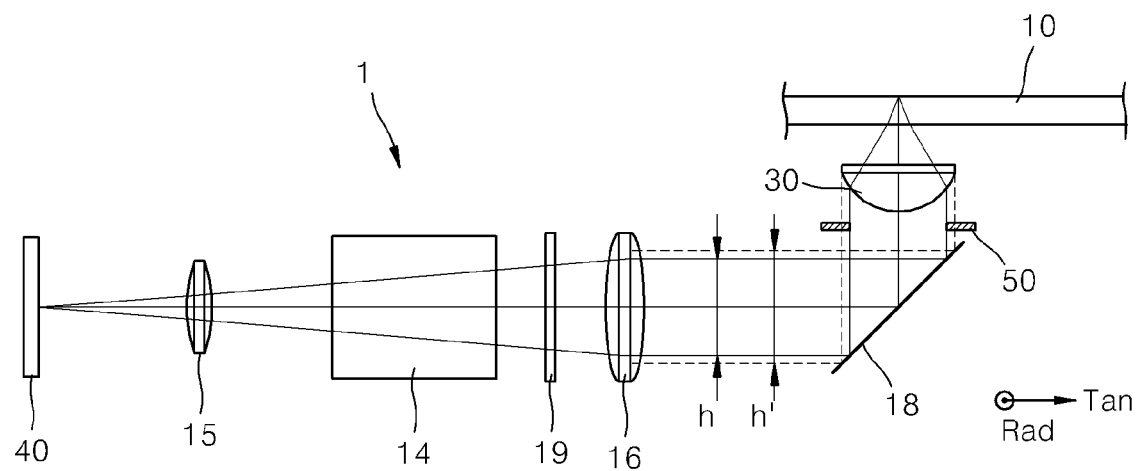
FIG. 2 is a diagram illustrating an example of a side-perspective view of the optical pickup of FIG. 1.
Figure 3:
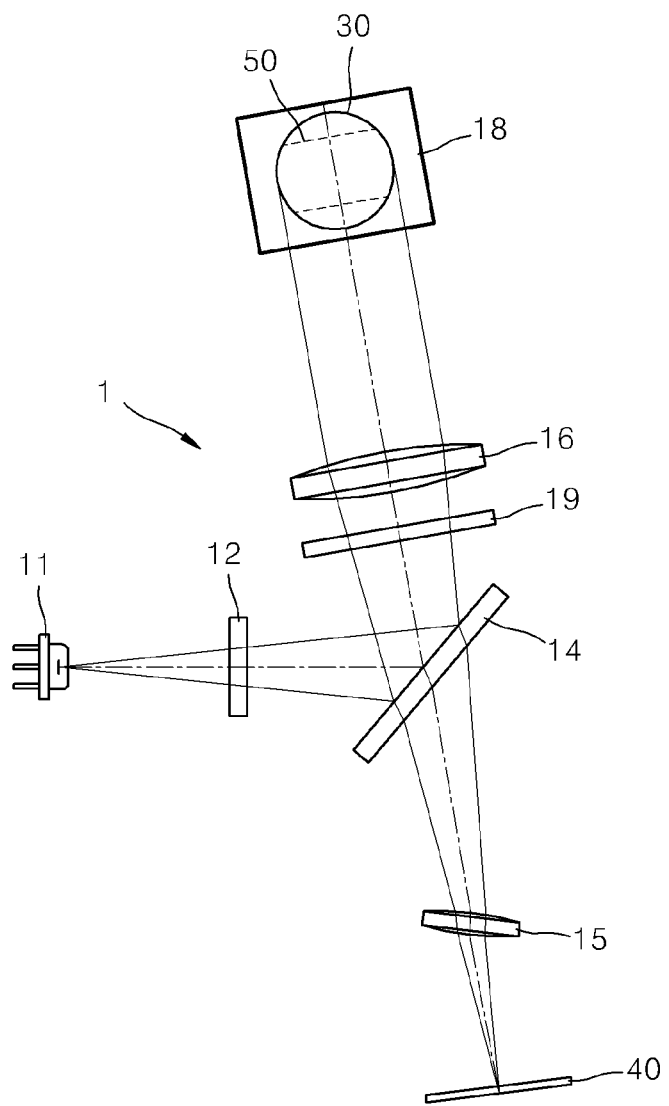
FIG. 3 is a diagram illustrating an example of the optical pickup of FIG. 1 including a shape of a light beam in an entrance pupil.

FIG. 1 illustrates an example of an exploded perspective view of an optical pickup. FIG. 2 illustrates an example of a side-sectional view of the optical pickup of FIG. 1. FIG. 3 illustrates an example of the optical pickup of FIG. 1 including a shape of a light beam in an entrance pupil.

Referring to FIGS. 1 through 3, the optical pickup includes an optical unit 1, an objective lens 30, and an aperture 50. The objective lens 30 may focus a light beam that is incident from the optical unit 1 onto an information storage medium 10. The aperture 50 is disposed at a side where a light beam is incident from the optical unit 1 on the objective lens 30. According to various aspects, the aperture 50 may limit a range of the light beam from the optical unit 1. For example, the aperture 50 may limit a range of a light beam such that a width of a light beam incident on the objective lens 30 in a first direction corresponding to a height direction of the optical pickup is less than a width in a second direction that crosses or that is perpendicular to the first direction.

The optical unit 1 includes at least one light source 11 that emits a light beam for recording/reproducing information to/from the information storage medium 10. The optical unit 1 also includes an optical path changer that changes a travel path of an incident light beam and a photodetector 40 that detects an information signal and/or an error signal by receiving a light beam reflected from the optical information storage medium 10.

The optical path changer may be a polarization-dependent optical path changer, for example, a polarization beam splitter 14 for changing a travel path of an incident light beam according to polarization, and a quarter-wave plate 19 for altering a polarization state of an incident light beam which is disposed between the polarization beam splitter 14 and the objective lens 30.

The optical pickup may further include a grating 12 that may split a light beam emitted from the light source 11 into a $0^{th}$-order light beam (i.e., a main light beam) and a $\pm 1^{st}$-order light beam (i.e., a sub-light beam) in order to detect a tracking error signal, for example, using a 3-beam method, a differential push-pull method, and the like. A reproduction signal may be obtained from a detection signal of the $0^{th}$-order light beam reflected by the optical information storage medium 10 and a tracking error signal may be obtained by performing an arithmetic operation on the detection signal of the $0^{th}$-order light beam and a detection signal of the $\pm 1^{st}$-order light beam reflected by the optical information storage medium 10.

In FIGS. 1 through 3, reference numeral 16 denotes a collimating lens that may collimate a light beam that is radiated from the light source 11 and may output the collimated light beam to the objective lens 30. Reference numeral 15 denotes an astigmatic lens that generates astigmatism to detect a focus error signal using an astigmatic method. Also, reference numeral 18 denotes a reflective mirror that changes a direction of light through reflection.

The light source 11 may emit light of a predetermined wavelength. For example, the light source 11 may be a light source that emits light in a blue wavelength according to a Blu-ray disc (BD) standard such as light with a wavelength of about 405 nm. As another example, the light source 11 may be a 2-wavelength light source (e.g., a twin-laser diode (LD)) which emits light of a red wavelength and light of an infrared wavelength, for example, light with a wavelength of about 650 nm and light with a wavelength of about 780 nm, so as to be compatible with a digital versatile disc (DVD) and a compact disc (CD).

The objective lens 30 focuses light emitted from the light source 11 to form a light spot on the information storage medium 10. The objective lens 30 may have a high numerical aperture that satisfies a BD standard or may have a numerical aperture that is compatible with a DVD and a CD.

In an example in which the light source 11 emits light in a blue wavelength range and the objective lens 30 has a numerical aperture of 0.85 or the like, the optical pickup may record and/or reproduce information to and/or from a high-density optical information storage medium such as an optical disc following a BD standard. In an example in which the light source 11 emits light in a red wavelength range and light in an infrared wavelength range and the objective lens 30 has a numerical aperture for both a DVD and a CD, the optical pickup may record and/or reproduce information to and/or from a DVD and a CD. When information is recorded/reproduced to/from DVDs and CDs using the optical structure of FIG. 1, a 2-wavelength light source, that is, a twin LD, for both DVDs and CDs, may be used as the light source 11.

It should be appreciated that a wavelength of the light source 11 and a numerical aperture of the objective lens 30 may be variously changed, and the optical configuration of the optical pickup may also be variously changed.

For example, to be compatible with Blu-ray discs (BDs) and DVDs, the optical pickup may use light sources of a plurality of wavelengths, for example, a light source of a blue wavelength suitable for high-density optical discs and a light source of a red wavelength suitable for DVDs. In addition, the objective lens 30 may be configured to attain an effective numerical aperture suitable for BDs and DVDs, or may further include a separated member for adjusting the effective numerical aperture of the objective lens 30.

For example, the optical pickup may record and/or reproduce information to and/or from high-density optical discs using the optical configuration of FIG. 1 and may further include an additional optical configuration for recording and/or reproducing information to and/or from DVDs and/or CDs. As another example, the optical pickup may record and/or reproduce information to and/or from DVDs and/or CDs using the optical configuration of FIG. 1 and may further include an additional optical configuration for recording and/or reproducing information to and/or from high-density optical information storage media such as BDs.

The polarization-dependent optical path changer, for example, the polarization beam splitter 14, may guide light that is incident from the light source 11 toward the objective lens 30, and guide light that is reflected from the information storage medium 10 toward the photodetector 40. In FIGS. 1 through 3, the polarization beam splitter 14 may selectively transmit or reflect incident light according to a polarization state. Alternatively, a polarization hologram element that transmits one polarized light emitted from the light source 11 and diffracts other polarized light reflected from the optical information storage medium 10 into $+1^{st}$-order light or $-1^{st}$-order light may be used as the polarization-dependent optical path changer. In an example in which the polarization hologram element is used as the polarization-dependent optical path changer, the light source 11 and the photodetector 40 may be optically modularized.

In an example in which the polarization beam splitter 14 and the quarter-wave plate 19 are used, one linearly-polarized light, for example, p-polarized light, incident from the light source 11 on the polarization beam splitter 14 may be transmitted through an inclined surface of the polarization beam splitter 14. Accordingly, the light may be changed to one circularly-polarized light while passing through the quarter-wave plate 19, and the one circularly-polarized light may be directed toward the information storage medium 10. The one circularly-polarized light may be changed to other circularly-polarized light when reflected by the information storage medium 10, and the other circularly-polarized light may be changed to another linearly-polarized light, for example, s-polarized light, while passing through the quarter-wave plate 19. The linearly-polarized light may be reflected by the inclined surface of the polarization beam splitter 14 toward the photodetector 40.

As another example, instead of the polarization-dependent optical path changer, a beam splitter that transmits and reflects incident light at a predetermined ratio or a hologram element that transmits light emitted from the light source 11 and diffracts light reflected by the optical information storage medium 10 into +1$^{st}$-order light or −1$^{st}$-order light may be used.

When light emitted from the light source 11 is split into at least three light beams, for example, by the grating 12 as shown in FIGS. 1 through 3, the photodetector 40 may include a main photodetector, and sub photodetectors that are disposed at both sides of the main photodetector and receive sub-light reflected from the optical information storage medium 10.

In the optical pickup described with reference to FIGS. 1 through 3, a height of the optical pickup is defined as an effective light beam width h (shown in FIG. 2) of a collimated light beam. The collimated light beam is obtained by the collimating lens 16 of the optical unit 1 and is incident on the objective lens 30 in a direction perpendicular to a plane consisting of a tangential direction Tan and a radial direction Rad as shown in FIG. 2. The effective light beam width h corresponds to an effective diameter of the light beam incident on the objective lens 30 in the tangential direction Tan of the optical information storage medium 10.

Because the optical pickup includes the aperture 50 that is disposed at a side where a light beam is incident from the optical unit 1 on the objective lens 30, a height of the optical pickup may be reduced. For example, the aperture 50 may be disposed to limit a range of a light beam such that a width of a light beam incident on the objective lens 30 in a first direction corresponding to a height direction of the optical pickup, that is, the tangential direction Tan of the optical information storage medium 10 is less than a width in a second direction that crosses the first direction, that is, the radial direction Rad of the optical information storage medium 10.

In FIG. 2, h' corresponds to an effective diameter of a light beam incident on the objective lens 30 in the tangential direction Tan of the optical information storage medium 10 when a circular aperture is used.

The optical unit 1 described herein includes the objective lens 30 and the aperture 50. However, it should be appreciated that the optical unit 1 may include optical elements other than or in addition to the objective lens 30 and the aperture 50 in the optical configuration of the optical pickup. That is, the optical unit 1 is not limited to the configuration shown in the examples of FIGS. 1-3.

Figure 4:
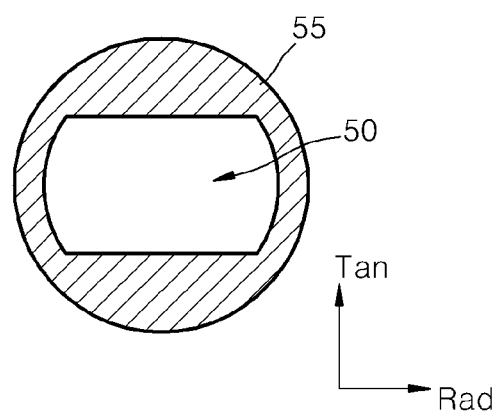
FIG. 4 is a diagram illustrating an example of an aperture used for an optical pickup.

FIG. 4 illustrates an example of the aperture 50 used for the optical pickup.

In FIG. 4, the aperture 50 has an oblong shape. A frame 55 encloses the oblong-shaped aperture 50. The frame 55 of FIG. 4 is exemplary, and may have any of various shapes. For example, although the frame 55 of the aperture 50 has a substantially circular shape and has a size shown in FIG. 4, the frame 55 may have a different shape and/or may be of a different size.

The aperture 50 corresponds to an entrance pupil that has an oblong shape of the objective lens 30. The aperture 50 may or may not be a separate member from the objective lens 30. When the aperture 50 is a separate member, the aperture 50 may be integrally formed with the objective lens 30. For example, the aperture 50 may be formed such that the aperture 50 moves along with the objective lens 30 without moving relative to the objective lens 30.

Figure 5:
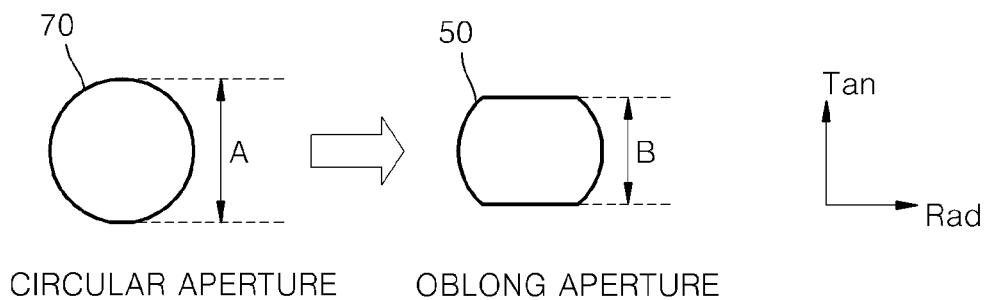
FIG. 5 is a diagram illustrating an example of a circular aperture and an aperture having an oblong shape.

The aperture 50 may be obtained by cutting both sides of a circular aperture 70 (corresponding to a circular entrance pupil) as shown in FIG. 5. A first direction in which the both sides are cut may be the tangential direction Tan of the information storage medium 10, and a second direction that crosses the tangential direction Tan may be the radial direction Rad of the information storage medium 10. That is, a width in a direction in which the both sides are cut may correspond to a height of the optical pickup.

For example, a width of the circular aperture 70 may be A and a width of the aperture 50 having an oblong shape which is obtained by cutting both sides of the circular aperture 70 may be B. According to various aspects, a ratio of the width B to the width A may be equal to or greater than about 80%. That is, a ratio of a width in the first direction (the tangential direction Tan) to a width in the second direction (the radial direction Rad) may be equal to or greater than 80% and less than 100%. In the optical pickup, the aperture 50 may be provided such that a width of a light beam in the tangential direction Tan is reduced by 20% or less.

Figure 6:
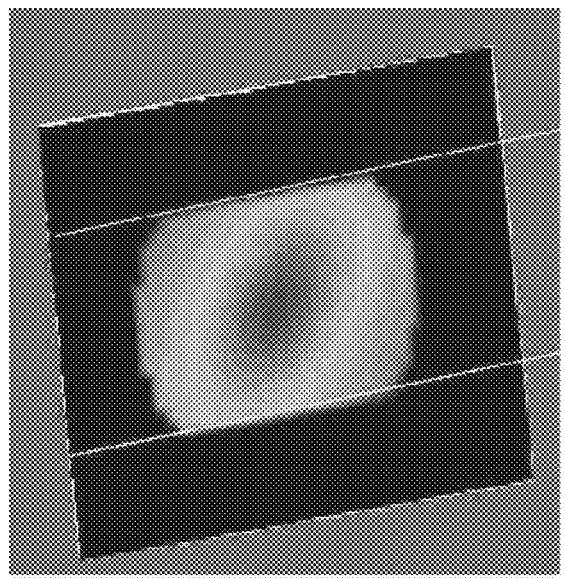
FIG. 6A is a diagram illustrating an example of a light beam passing through an aperture having an oblong shape.
FIG. 6B is a diagram illustrating an example of a light beam passing through the circular aperture.
Figure 6:
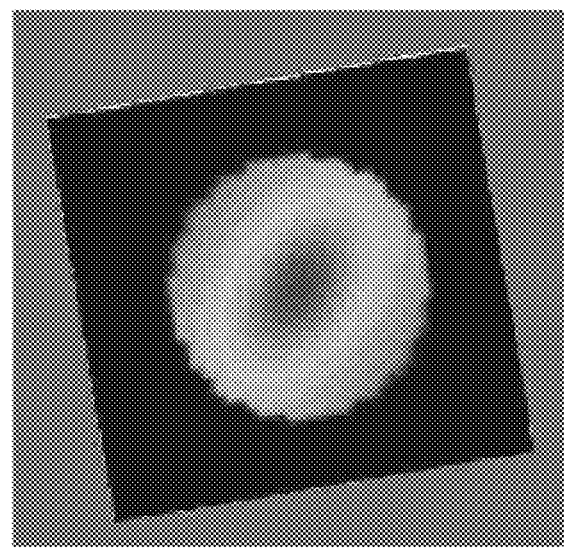

An example of a light beam passing through the aperture 50 that has an oblong shape is shown in FIG. 6A. FIG. 6B illustrates an example of a light beam passing through the circular aperture 70.

Table 1 shows an example of a relationship between an aperture size ratio (B/A), a variation of a spot size in the radiation direction Rad and the tangential direction Tan, and jitters of an RF signal. In this example, the jitters are obtained after equalization (Eq).

TABLE 1

| Aperture size ratio | Spot size | | Jitters of RF signal |
|---|---|---|---|
| [B/A * 100] | Rad | Tan | (after Eq) |
| 100% | 0.85 μm | 0.90 μm | 6.63% |
| 90% | 0.87 μm | 0.92 μm | 6.75% |
| 80% | 0.90 μm | 0.95 μm | 9.13% |
| 70% | 0.92 μm | 0.97 μm | 13.5% |
| 60% | 0.97 μm | 1.00 μm | 20.7% |

As shown in Table 1, as the aperture size ratio B/A increases, that is, a width of the aperture 50 in the tangential direction Tan increases with respect to a width of the aperture 50 in the radial direction Rad, and the jitters of the RF signal deteriorate. However, until the aperture size ratio B/A reaches 80%, the jitters of the RF signal are small enough to obtain a reproduction signal of information recorded on the optical information storage medium 10.

According to the optical pickup described herein, because a width of an effective light beam incident on the objective lens 30 in a direction corresponding to a height direction of the optical pickup is reduced using the aperture 50 having an oblong shape, a height of the optical pickup may be reduced. Accordingly, an optical pickup having a slimmer design may be generated.

As an example, the slim optical pickup and an optical system using the same may be applied to slim portable devices such as a thin ultrabook that has a thickness equal to or less than about 20 mm.

Figure 7:
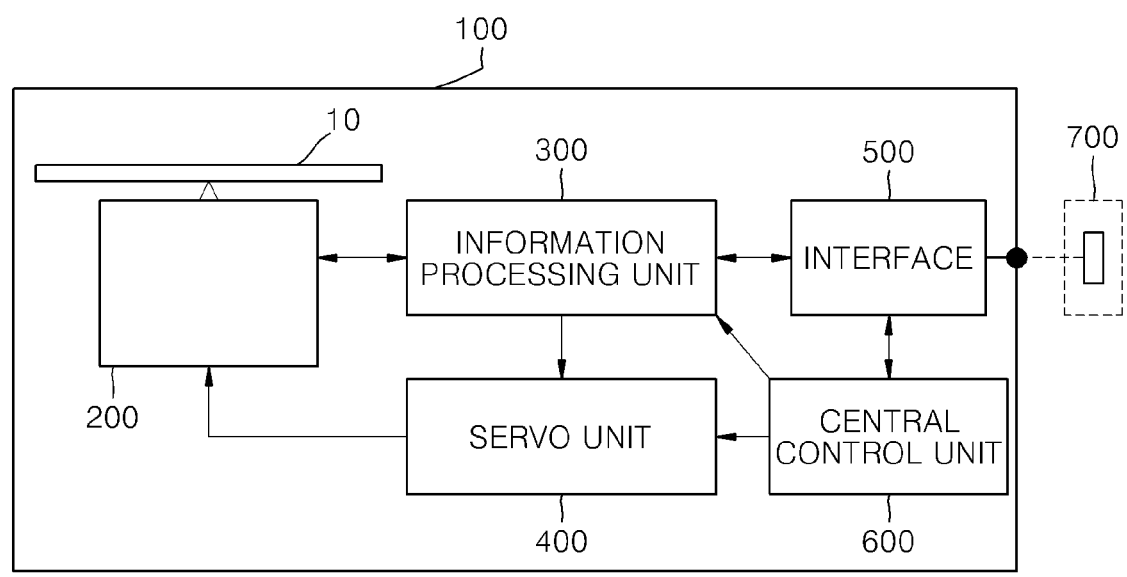
FIG. 7 is a diagram illustrating an example of an optical system using an optical pickup Throughout the drawings and the detailed description, unless otherwise described, the same drawing reference numerals will be understood to refer to the same elements.

FIG. 7 illustrates an example of an optical system 100 using an optical pickup.

Referring to FIG. 7, the optical system 100 includes an optical pickup 200 that is provided to move in a radial direction of an optical information storage medium 10. The optical pickup 200 records and reproduces information to and from the optical information storage medium 10. The optical system 100 also includes a control unit 600 that controls the optical pickup 200.

The optical pickup 200 includes an optical system that has any of the various configurations as described in the examples herein, and a mechanical system that mechanically supports the optical system and performs focusing and tracking.

In this example, the optical system 100 including an encoder/decoder that is connected to an information processing unit 300 that is connected to an interface 500 which is used to connect to an external host. In addition, the mechanical system is connected to a servo unit 400. The information processing unit 300, the servo unit 400, and the interface 500 may be controlled by the central control unit 600. The interface 500 may satisfy various standards, for example, a universal serial bus (USB) port, and may be connected to a host, for example, a computer 700 using a USB protocol to receive and transmit information.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup comprising:
   an optical unit comprising at least one light source configured to emit a light beam for recording/reproducing information to/from an information storage medium, and at least one photodetector configured to detect an information signal and/or an error signal by detecting a light beam reflected from the information storage medium;
   an objective lens configured to focus a light beam incident from the optical unit on the information storage medium; and
   an aperture that is disposed at a side at which the light beam is incident from the optical unit on the objective lens, and configured to limit a range of the light beam such that a width of the light beam incident on the objective lens in a first direction corresponding to a height direction of the optical pickup is less than a width in a second direction that is perpendicular to the first direction,
   wherein the aperture is integrally formed with the objective lens.

2. The optical pickup of claim 1, wherein the aperture comprises an oblong shape.

3. The optical pickup of claim 1, wherein a ratio of the width of the aperture in the first direction to the width of the aperture in the second direction is equal to or greater than 80%.

4. The optical pickup of claim 1, wherein the first direction of the aperture comprises a tangential direction and the second direction of the aperture comprises a radial direction.

5. The optical pickup of claim 1, wherein the at least one light source comprises a light source configured to emit a light beam according to a Blu-ray disc (BD) standard.

6. The optical pickup of claim 1, wherein the optical pickup comprises a height that is approximately equal to the width of the aperture in the first direction.

7. An optical pickup comprising:
   an optical unit comprising at least one light source configured to emit a light beam for recording/reproducing information to/from an information storage medium, and at least one photodetector configured to detect an information signal and/or an error signal by detecting a light beam reflected from the information storage medium;
   an objective lens configured to focus a light beam incident from the optical unit on the information storage medium, the objective lens comprising an entrance pupil that has an oblong shape, the light beam being emitted from the light source with its axis parallel to a short side of the oblong shape, and
   an aperture configured to be formed with the objective lens.

8. The optical pickup of claim 7, wherein the entrance pupil comprises a width of the entrance pupil in a first direction corresponding to a height direction of the optical pickup that is less than a width of the entrance pupil in a second direction, and the second direction of the entrance pupil is perpendicular to the first direction of the entrance pupil.

9. The optical pickup of claim 8, wherein a ratio of the width of the entrance pupil in the first direction to the width of the entrance pupil in the second direction is equal to or greater than 80%.

10. The optical pickup of claim 8, wherein the first direction of the entrance pupil is a tangential direction and the second direction of the entrance pupil is a radial direction.

11. The optical pickup of claim 8, wherein the optical pickup comprises a height that is approximately equal to the width of the entrance pupil in the first direction.

12. The optical pickup of claim 7, wherein the aperture is directly connected to the objective lens.

13. The optical pickup of claim 7, wherein the optical unit further comprises:
   a reflective mirror configured to change the direction of the light beam towards the objective lens.

14. An optical system comprising:
   an optical pickup configured to move in a radial direction of an information storage medium and configured to record and/or reproduce information to and/or from the information storage medium, the optical pickup comprising:
      an objective lens configured to focus a light beam incident from an optical unit on the information storage medium, and
      an aperture comprising an entrance pupil that has an oblong shape, the light beam being emitted with its axis parallel to a short side of the oblong shape,
      wherein the aperture is integrally formed with the objective lens; and
   a control unit configured to control the optical pickup.

15. The optical system of claim 14, wherein the entrance pupil comprises a width of the entrance pupil in a first direction corresponding to a height direction of the optical pickup that is less than a width of the entrance pupil in a second direction, and the second direction of the entrance pupil that is perpendicular to the first direction of the entrance pupil.

16. The optical system of claim 14, wherein the optical pickup comprises a height that is approximately equal to the width of the entrance pupil in the first direction.

17. The optical system of claim 15, wherein a ratio of the width of the entrance pupil in the first direction to the width of the entrance pupil in the second direction is equal to or greater than 80%.

18. The optical system of claim 14, wherein the optical pickup comprises:
    a hologram element configured to transmit the emitted light beam to the information storage device and diffract light reflected by the information storage device into $+1^{st}$ order light or $-1^{st}$ order light.

* * * * *